United States Patent
Crothers et al.

(10) Patent No.: US 9,964,045 B2
(45) Date of Patent: May 8, 2018

(54) METHODS AND SYSTEMS FOR DETECTING LEAN BLOWOUT IN GAS TURBINE SYSTEMS

(71) Applicant: General Electric Company, Schenectady, NY (US)

(72) Inventors: Sarah Lori Crothers, Greenville, SC (US); Scott Arthur Day, Greenville, SC (US); Scott Alan Kopcho, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1100 days.

(21) Appl. No.: 14/171,001

(22) Filed: Feb. 3, 2014

(65) Prior Publication Data

US 2015/0219019 A1     Aug. 6, 2015

(51) Int. Cl.
F02C 9/28     (2006.01)

(52) U.S. Cl.
CPC ............ *F02C 9/28* (2013.01); *F05D 2220/32* (2013.01); *F05D 2260/83* (2013.01); *F05D 2270/083* (2013.01); *F05D 2270/092* (2013.01); *F05D 2270/54* (2013.01)

(58) Field of Classification Search
CPC ........ F23N 2041/20; F23R 2900/00013; F02C 9/28; F05D 2270/083; F05D 2270/14; F05D 2270/092; F05D 2260/964; F05B 2270/1072
See application file for complete search history.

(56) References Cited

U.S. PATENT DOCUMENTS

| 2,072,826 A | 3/1937 | Riley |
| 5,943,866 A | 8/1999 | Lovett et al. |
| 6,164,055 A | 12/2000 | Lovett et al. |

(Continued)

FOREIGN PATENT DOCUMENTS

| EP | 1605205 | 12/2005 |
| EP | 1605205 A2 | 12/2005 |

(Continued)

OTHER PUBLICATIONS

Richards, Geo et al., "Effect of Fuel System Impedance Mismatch on Combustion Dynamics," ASME Turbo Expo 2005: Power for Land, Sea, and Air, vol. 2, Paper No. GT2005-68386, Reno, Nevada, Jun. 6-9, 2005, 11 pgs.

(Continued)

*Primary Examiner* — Gerald L Sung
*Assistant Examiner* — Rene Ford
(74) *Attorney, Agent, or Firm* — Charlotte C. Wilson; Ernest G. Cusick; Frank A. Landgraff

(57) ABSTRACT

A system includes a control system. The control system includes a coherence derivation system configured to derive a coherence between respective outputs of each of a plurality of combustors coupled to a gas turbine system, and a phase derivation system configured to derive a phase difference between the respective outputs of each of the plurality of combustors coupled to the gas turbine system. The control system is configured to derive an indication of an impending lean blowout (LBO) or an actual LBO of at least one of the plurality of combustors based at least in part on the coherence derivation, the phase derivation, or a combination thereof.

8 Claims, 4 Drawing Sheets

(56) References Cited

U.S. PATENT DOCUMENTS

| | | | |
|---|---|---|---|
| 6,205,765 B1* | 3/2001 | Iasillo | F02C 7/22 |
| | | | 431/114 |
| 6,625,569 B2 | 9/2003 | James et al. | |
| 6,820,431 B2 | 11/2004 | McManus et al. | |
| 7,278,266 B2 | 10/2007 | Taware et al. | |
| 7,337,057 B2 | 2/2008 | Norman et al. | |
| 7,451,601 B2 | 11/2008 | Taware et al. | |
| 7,503,177 B2 | 3/2009 | Bland et al. | |
| 7,523,614 B2 | 4/2009 | Tanimura et al. | |
| 7,578,130 B1 | 8/2009 | Kraemer et al. | |
| 7,620,461 B2 | 11/2009 | Frederick, II et al. | |
| 7,693,147 B2 | 4/2010 | Williams et al. | |
| 7,739,999 B2 | 6/2010 | Kang et al. | |
| 7,743,599 B2 | 6/2010 | Taware et al. | |
| 7,805,922 B2 | 10/2010 | Bland | |
| 7,908,072 B2 | 3/2011 | Tonno et al. | |
| 7,997,083 B2 | 8/2011 | Meadows et al. | |
| 8,112,216 B2 | 2/2012 | Davis, Jr. et al. | |
| 8,322,140 B2 | 12/2012 | Kim et al. | |
| 8,966,909 B2 | 3/2015 | Crothers et al. | |
| 2005/0278108 A1 | 12/2005 | Norman et al. | |
| 2006/0041368 A1 | 2/2006 | Williams et al. | |
| 2006/0042261 A1 | 3/2006 | Taware et al. | |
| 2006/0254279 A1 | 11/2006 | Taware et al. | |
| 2007/0180831 A1 | 8/2007 | Bland | |
| 2007/0214796 A1* | 9/2007 | Bland | F01D 21/003 |
| | | | 60/772 |
| 2007/0214797 A1* | 9/2007 | Bland | F01D 21/003 |
| | | | 60/772 |
| 2008/0010966 A1 | 1/2008 | Taware et al. | |
| 2009/0005951 A1 | 1/2009 | Frederick et al. | |
| 2009/0005952 A1 | 1/2009 | Tonno et al. | |
| 2009/0063003 A1 | 3/2009 | Meadows et al. | |
| 2010/0170254 A1 | 7/2010 | Venkataraman et al. | |
| 2010/0192578 A1 | 8/2010 | Singh et al. | |
| 2010/0313568 A1 | 12/2010 | Davis, Jr. et al. | |
| 2011/0067377 A1* | 3/2011 | Singh | F23R 3/48 |
| | | | 60/39.37 |
| 2011/0072826 A1 | 3/2011 | Narra et al. | |
| 2011/0162370 A1 | 7/2011 | Kim et al. | |
| 2011/0179795 A1 | 7/2011 | Johnson et al. | |
| 2012/0006029 A1 | 1/2012 | Bilbao et al. | |
| 2013/0000312 A1 | 1/2013 | Kodukulla et al. | |
| 2013/0014514 A1 | 1/2013 | Romig et al. | |
| 2014/0053528 A1 | 2/2014 | Crothers et al. | |
| 2014/0060063 A1 | 3/2014 | Boardman et al. | |
| 2014/0109587 A1 | 4/2014 | Crothers et al. | |
| 2014/0137561 A1 | 5/2014 | Crothers et al. | |
| 2014/0238026 A1 | 8/2014 | Boardman et al. | |
| 2014/0238033 A1 | 8/2014 | Crothers et al. | |
| 2014/0238041 A1 | 8/2014 | Crothers et al. | |
| 2014/0260299 A1 | 9/2014 | Boardman et al. | |

FOREIGN PATENT DOCUMENTS

| | | |
|---|---|---|
| EP | 1632718 | 3/2006 |
| EP | 1632718 A2 | 3/2006 |
| EP | 2031192 | 3/2009 |
| EP | 2031192 A2 | 3/2009 |

OTHER PUBLICATIONS

Spoor et al., "Mode-locking of acoustic resonators and its application to vibration cancellation in acoustic heat engines," Condensed Matter and Thermal Physics Group, Los Alamos National Laboratory, Los Alamos, New Mexico, Feb. 10, 1999, 10 pgs.
U.S. Appl. No. 14/192,687, filed Feb, 26, 2014, Crothers et al.
U.S. Appl. No. 14/207,041, filed Mar. 12, 2012, Crothers et al.
U.S. Appl. No. 14/276,700, filed May 13, 2014, Crothers et al.
U.S. Appl. No. 14/249,158, filed Apr. 9, 2014, Ziminsky et al.
U.S. Appl. No. 14/248,194, filed Apr. 8, 2014, Stevenson et al.
U.S. Appl. No. 14/288,875, filed May 28, 2014, Crothers et al.
U.S. Appl. No. 14/288,974, filed May 28, 2014, Crothers et al.
U.S. Appl. No. 14/316,616, filed Jun. 26, 2014, Crothers et al.
U.S. Appl. No. 14/659,399, filed Mar. 16, 2015, DiCintio et al.
U.S. Appl. No. 14/170,702, filed Feb. 3, 2014, Day et al.
U.S. Appl. No. 14/170,710, filed Feb. 3, 2014, Carnell Jr. et al.
U.S. Appl. No. 14/170,716, filed Feb. 3, 2014, Crothers et al.
U.S. Appl. No. 14/170,729, filed Feb. 3, 2014, Crothers et al.
U.S. Appl. No. 14/170,738, filed Feb. 3, 2014, Crothers et al.
U.S. Appl. No. 14/154,925, filed Jan. 14, 2014, Aphale et al.
U.S. Appl. No. 14/048,252, filed Oct. 8, 2013, Crothers et al.

* cited by examiner

METHODS AND SYSTEMS FOR DETECTING LEAN BLOWOUT IN GAS TURBINE SYSTEMS

BACKGROUND

The invention relates generally to gas turbine systems, and more specifically to methods and systems for detecting and minimizing lean blowouts of combustors within gas turbine systems.

Lean blowout (LBO) of can-annular combustion systems within gas turbine systems may result when an air-to-fuel ratio decreases to a level too low for sustained combustion. Certain methods of detecting LBO events may be highly variable, particularly, depending upon operating parameters that may vary according to the specific gas turbine system. It may be useful to provide improved methods to detect and minimize LBO events in gas turbine systems.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A system includes a control system. The control system includes a coherence derivation system configured to derive a coherence between respective outputs of each of a plurality of combustors coupled to a gas turbine system, and a phase derivation system configured to derive a phase difference between the respective outputs of each of the plurality of combustors coupled to the gas turbine system. The control system is configured to derive an indication of an impending lean blowout (LBO) or an actual LBO of at least one of the plurality of combustors based at least in part on the coherence derivation, the phase derivation, or a combination thereof.

A non-transitory computer-readable medium having code stored thereon, the code includes instructions to derive a coherence between respective outputs of each of a plurality of combustors of a gas turbine system, derive a phase difference between the respective outputs of each of the plurality of combustors of the gas turbine system, and to determine a probability of an impending LBO or an actual LBO of at least one of the plurality of combustors based at least in part on the coherence, the phase difference, or a combination thereof.

A method includes deriving a coherence between respective outputs of each of a plurality of combustors of a gas turbine system, deriving a phase difference between the respective outputs of each of the plurality of combustors of the gas turbine system, determining an indication of an impending LBO or an actual LBO of at least one of the plurality of combustors based at least in part on the coherence, the phase difference, or a combination thereof, and determining a control action based at least in part on the coherence, the phase difference, or the combination thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods useful in detecting and deriving combustion system signal coherence and signal phase measurements as an indication of an impending or an actual lean blowout (LBO) of one or more combustors of the combustion system, and to provide a notification and/or execute a control action to prevent an impending LBO, or to respond to the occurrence of an actual LBO. Specifically, as the individual combustors begin to pulsate together, for example, at the same frequency, the measured signal coherence will increase. Indeed, as the pulsations propagate from one combustor to the next, causing an increasing number of combustors to pulsate together (e.g., phase-lock), the measured phase difference between output signals of the combustors may decrease. Thus, the probability of an impending LBO or an actual LBO may be determined based solely upon the measured signal coherence, solely upon the measured phase difference, or determined based upon a combination of the measured signal coherence and the measured phase difference. As used herein, an "actual LBO" may refer to an actual loss of flame in one or more individual combustors. Likewise, an "impending LBO" may refer to a condition in which an actual LBO is highly likely to occur. Similarly, "coherence" may refer to a measure of the linear relationship between respective output signals (e.g., pressure and/or flame output) of certain combustor observations.

Figure 1:
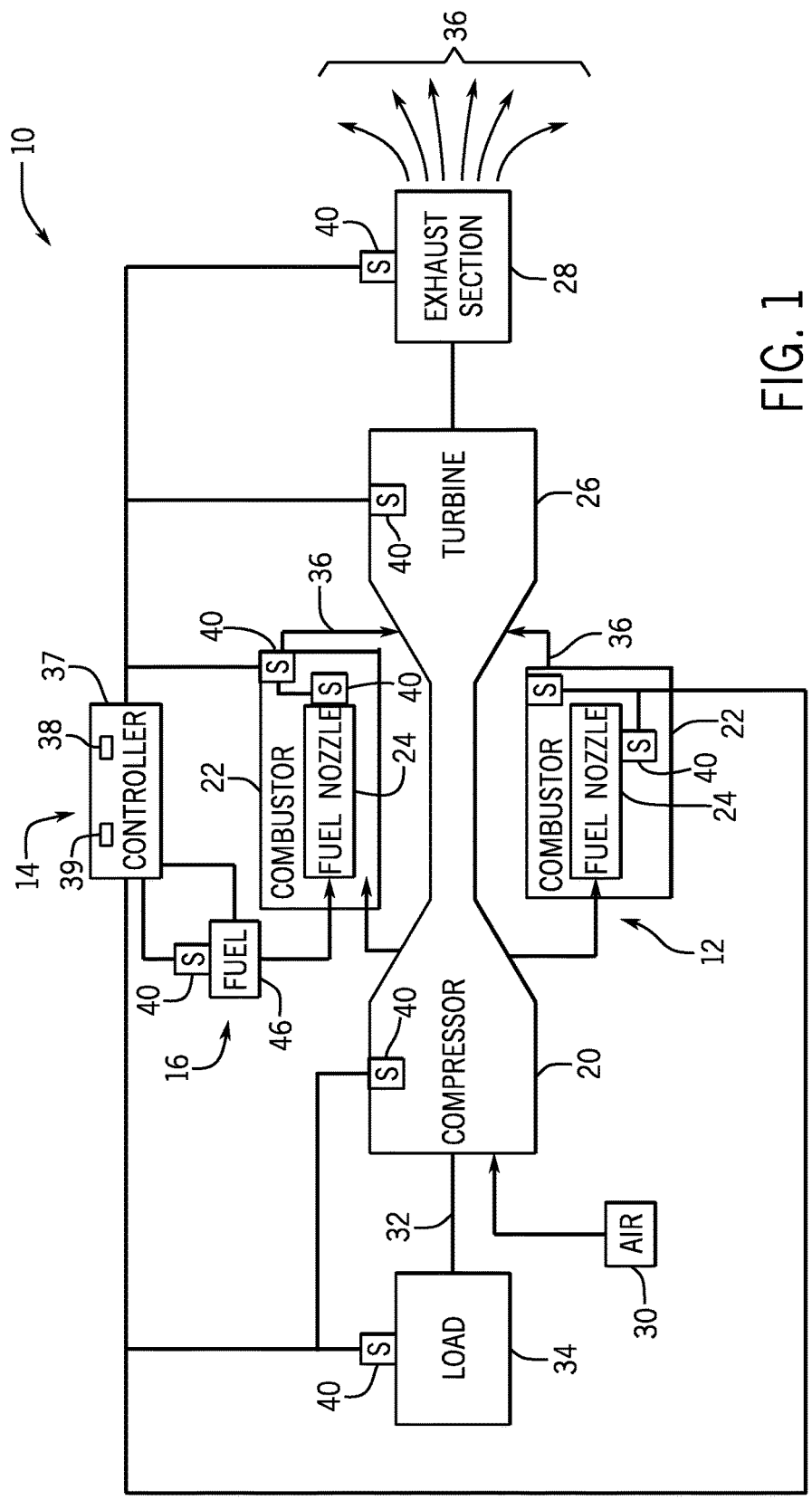
FIG. 1 is a block diagram of an embodiment of a gas turbine system, in accordance with present embodiments.

With the foregoing in mind, it may be useful to describe an embodiment of a gas turbine system, such as an example gas turbine system 10 illustrated in FIG. 1. In certain embodiments, the gas turbine system 10 may include a gas turbine 12, a control system 14, and a fuel supply system 16. These systems may operate in conjunction to detect impending LBO conditions and to minimize actual LBO events within the gas turbine system 10. As illustrated, the gas turbine 12 may include a compressor 20, combustion system 22, fuel nozzle 24, turbine 26, and exhaust section 28. During operation, the gas turbine 12 may pull air 30 into the compressor 20, which then compresses the air 30 and moves it to the combustion system 22 (e.g., a plurality of combustors). In the combustion system 22, the fuel nozzle 24 (or a plurality of fuel nozzles) injects fuel that mixes with the compressed air creating an air-fuel mixture. The air-fuel mixture may combust in the combustion system 22 to generate hot combustion gases, which flow downstream into the turbine 26 to drive one or more turbine 26 stages. For example, the combustion gases move through the turbine 26 to drive one or more stages of turbine 26 blades, which in turn drive rotation of shaft 32. The shaft 32 connects to a load 34, such as a generator that uses the torque of the shaft 32 to produce electricity. After passing through the turbine 26, the hot combustion gases may vent as exhaust gases 36 into the environment through the exhaust section 28. The exhaust gas 36 may include gases such as carbon dioxide ($CO_2$), carbon monoxide (CO), nitrogen oxides ($NO_x$), and so forth. As will be further appreciated, as the air-fuel mixture supplied to the combustion system 22 becomes lean (e.g., the air increases and/or the fuel decreases), the combustion system 22 may be susceptible to a possible LBO event.

In certain embodiments, the control system 14 may include a controller 37, a processor 38, and a memory 39, and may be communicatively coupled to sensors 40. The controller 37 may receive data from the sensors 40. In response to the sensor 40 data, the processor 38 may then execute instructions stored on the memory 39 based on the sensor data to control, for example, the fuel system 16, or other components of the gas turbine system 10. The sensors 40 may provide various data to the controller 37 including, for example, $CO_2$ levels in the exhaust gas 36, carbon content in the fuel 46, temperature of the fuel 46, temperature, pressure, clearance (e.g., distance between stationary and rotating components), flame temperature or intensity, vibration, combustion dynamics (e.g., fluctuations in pressure, flame intensity, and so forth), and load data from load 34. In one embodiment, the controller 37 may use data received from the sensors 40 to derive signal coherence and signal phase difference measurements to determine an actual or an impending LBO associated with the combustion system 22. Indeed, the controller 37 may be programmably retrofitted with instructions to determine the impending LBO without adding or removing certain hardware components.

Figure 2:
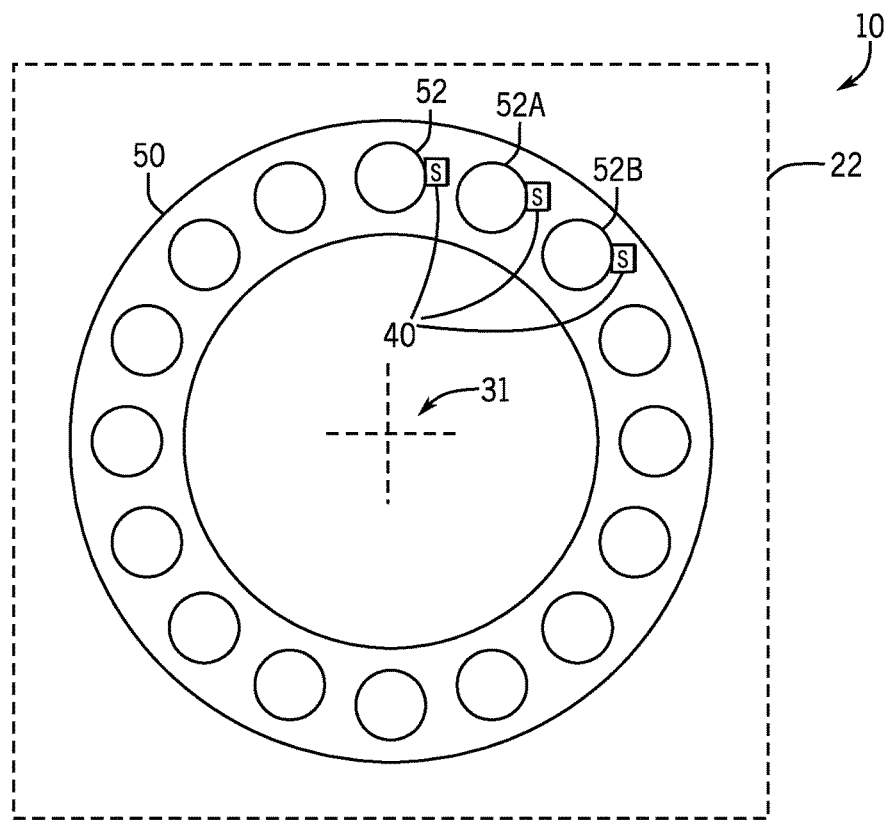
FIG. 2 is a diagram of an embodiment of a can-annular combustor included in the system of FIG. 1, in accordance with present embodiments.

In certain embodiments, as illustrated in FIG. 2, the combustion system 22 may include can combustors 52. The can combustors 52 may be an array of cylindrical combustion chambers. It should be appreciated that the can combustors 52 may include any number of cylindrical combustion chambers, including, for example, can combustors, can-annular combustors, annular combustors, and so forth. As such, each of the can combustors 52 may include, for example, fuel nozzles 24, igniters, liners, flow sleeves, transition pieces, and the like. Indeed, air from the compressor 20 may be passed into each of the individual can combustors 52, where the air may then be mixed with fuel and/or other lean (e.g., combustible materials) and ignited. Secondary air may also flow from the compressor 20, where the secondary air may be fed outside of a liner of the combustion system 22. As further depicted, the can combustors 52 may be arranged around a central axis 31 (e.g., rotational axis) of the gas turbine system 10. In this way, the exhaust of the can combustors 52 may be output to the turbine 26. As will be further appreciated, the can combustors 52 may be susceptible to an impending or an actual LBO, which may be detectable by coherence and phase measurements derived by the controller 37.

In certain embodiments, as noted above, an actual LBO of the can-annular combustors 52 may result when the air-fuel ratio decreases to a level too low to sustain gas combustion in one or more of the can combustors 52. Such conditions may lead to a loss of flame in the can combustors 52. In one embodiment, an impending LBO may be accompanied by the presence of a low frequency combustion dynamics tone (e.g., frequency tone of less than 100 Hz). This frequency range may be referred to as "LBO frequency". In such an embodiment, the impending LBO may be indicated by a relatively slow back and forth pressure pulsation in one or more of the can combustors 52. Indeed, due to the can-to-can (e.g., can combustor 52A to can combustor 52B) variation of fuel and air delivery, a single can combustor 52 may become lean in advance of the other can combustors 52. The pressure pulsations (e.g., pressure pulsations and/or flame pulsations) in the one lean can (e.g., can combustor 52A) may be propagated to the adjacent can combustor 52B, and then to the remaining can combustors 52. Specifically, such propagation (e.g., crosstalk) between the can combustors 52 may occur via an area in the annulus between or nearby the turbine 26, exhaust section 28, and the fuel nozzle 24. As the can combustor 52A (e.g., the first can combustor to run lean), for example, exhibits pulsations (e.g., pressure and/or flame pulsations), the can combustor 52A may force the adjacent (e.g., on either side) can combustor 52B to exhibit pulsations (e.g., pressure and/or flame pulsations) as well. While, the can combustor 52B may not run as lean as the can combustor 52A, the can combustor 52B may become unstable as well, as its flame is pulsed back and forth.

In certain embodiments, as a result of the low frequency (e.g., less than 100 Hz, LBO Frequency) and corresponding long wavelength, the pulsations in the can combustors 52 may phase lock, or pulsate at substantially the same time. Thus, since an impending LBO may begin in the can combustor 52A and propagate around to the remaining can combustors 52, the amplitude of the LBO frequency may increase as these so-called "LBO pulsations" propagate to other can combustors (e.g., can combustor 52B). Although, LBO pulsations may be minimized by controlling the amplitude of the LBO frequency, the amplitude at which an actual LBO event occurs may be highly variable. In another example, an indication of an impending or an actual LBO may include the level of NOx emissions generated by the turbine 26. However, such NOx emissions levels may require specific NOx margins to be sustained in order to reliably prevent an LBO event.

Figure 3:
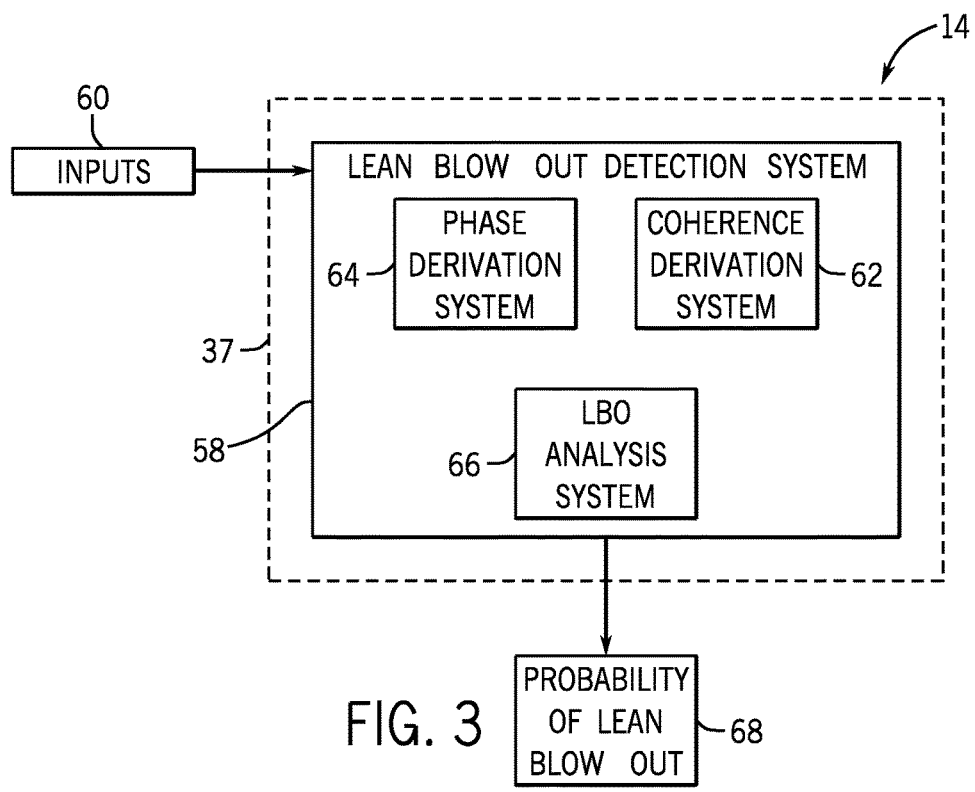
FIG. 3 is a block diagram of an embodiment of a LBO detection system for detecting both impending and actual LBO, in accordance with present embodiments.

In consideration of the foregoing, FIG. 3 is a block diagram of an embodiment of the control system 14 including an impending or an actual LBO detection system 58. As noted above with respect to FIG. 1, the control system 14 may include various systems (e.g., hardware systems, software systems, or a combination thereof) that may be used to detect and derive coherence and phase measurements as indications of an impending or an actual LBO of one or more of the can combustors 52. As illustrated, the LBO detection system 58 may receive inputs 60, which may include, for example, operational parameter inputs (e.g., $CO_2$ levels in the exhaust gas 36, carbon content in the fuel 46, temperature of the fuel 46, pressure, flow, clearance, vibrations, flame temperature, combustion pressure fluctuations, flame fluctuations, and so forth) received from the sensors 40. For example, the inputs 60 of combustion pressure fluctuations may include amplitude, frequency, and trends in pressure fluctuations in each can combustor 52, and also differentials from one can combustor 52 (e.g., can combustor 52A) to another (e.g., can combustor 52B). Likewise, the inputs 60 of flame fluctuations may include the intensity, frequency, and trends in flame fluctuations in each can combustor 52, and also differentials from one can combustor 52 (e.g., can combustor 52A) to another (e.g., can combustor 52B). The LBO detection system 58 may also include a coherence derivation system 62, a phase derivation system 64, and an LBO analysis system 66.

In certain embodiments, the coherence derivation system 62 may be a hardware system, a software system, or a combination thereof useful in measuring coherence of the pressure pulsations of the combustion cans 52, or more particularly, measuring the linear relationship between the pressure pulsation and/or flame pulsation signals of the combustion cans 52. For example, as the combustion cans 52 may begin to pulsate together at the same frequency, the measured coherence of the combustion cans 52 will increase. Indeed, the coherence derivation system 62 may measure the overlap in frequency components of the pressure signals for which the phase of the pressure signals is linear (e.g., constant with respect to timing). Thus, because the pressure pulsations and/or flame pulsations associated with an impending LBO event may occur at the same frequency, the coherence measurement may be high compared to the signal coherence of the dynamic pressure signals of the combustion cans 52 measured under normal operating conditions. As such, measuring coherence of the combustion cans 52 may indicate an impending LBO before the occurrence of an actual LBO.

Similarly, the phase derivation system 64 may be a hardware system, a software system, or a combination thereof, that may be useful in measuring phase difference in the pressure pulsation and/or flame pulsation signals of the combustion cans 52. Specifically, as the pressure pulsations and/or flame pulsations of other combustion cans 52 become less and less stable, and particularly as the number of combustion cans 52 pulsating together increases, the measured phase difference of the pressure signals of the can combustors 52 may decrease. Indeed, as previously noted, during an impending LBO, the pressure pulsations in one can combustors 52, due to flame fluctuations resulting from a low air-fuel ratio, induces a similar pressure pulsation and/or flame pulsation in an adjacent combustion can 52. The pressure pulsation may then cause the flame to fluctuate, becoming unstable. As the pressure pulsations propagate from can combustor 52-to can combustor 52 (e.g., from can combustor 52A to can combustor 52B, and so on), the coherence increases, as more and more can combustors 52 are driven to pulse at the same frequency. Thus, the pulsations may be occurring at substantially the same time, and by extension, each of the can combustors 52 may be pushing and/or pulling at substantially the same time. Accordingly, the respective pulsation signals of the can combustors 52 may become more in-phase (e.g., low phase difference). That is, similar to the measuring of the coherence of the pressure pulsation signals, the measuring of the phase of the pressure signals corresponding to each of the can combustors 52 may also indicate an impending LBO before the occurrence of an actual LBO.

Conversely, upon the occurrence of an actual LBO, the pressure and/or flame pulsations in the can combustors 52 may cease. Thus, the phase difference between the can combustors 52 may increase, while the coherence between the can combustors 52 may decrease. As such, measuring the phase of the pressure signals and/or the coherence of the pressure signals corresponding to each of the can combustors 52 may also indicate an occurrence of an actual LBO in one or more of the can combustors 52. In certain embodiments, the LBO analysis system 66 may determine a possible impending or actual LBO event based solely upon the coherence measurements derived by the coherence derivation system 62, or based solely upon the phase measurements derived by the phase derivation system 64. In other embodiments, the LBO analysis system 66 may determine an impending or an actual LBO based upon both the coherence measurements derived by the coherence derivation system 62 and the phase measurements derived by the phase derivation system 64. In either embodiment, the LBO analysis system 66 may output a probability of LBO event 68, which may be used, for example, to determine and execute a control action to prevent an impending LBO event from actually occurring, or to respond to the occurrence of an actual LBO.

In certain embodiments, the LBO analysis system 66 may order (e.g., for the purpose of analysis) the can combustors 52 into respective pairs of combustors. The LBO analysis system 66 may then use a single combustion can 52 (e.g., combustion can 52A) or one combustion can 52 for each pair of combustors as a reference (e.g., voltage reference, pressure reference, or similar detectable physical characteristic), and the coherence and phase measurements of each other can combustor 52 may be calculated with respect to the reference combustion can 52 (e.g., combustion can 52A). In other embodiments, each of the can combustors 52 may be a reference with respect to each other can combustor 52, such that parallel coherence and phase measurements may be calculated. In particular, the mean of the absolute value of the phase difference between the pressure signals for each pair of can combustors (e.g., can combustors 52A and 52B), as well as the mean of the coherence of the pressure signals for each pair of can combustors (e.g., can combustors 52A and 52B) may be calculated. When the mean coherence and mean phase measurement levels are above one or more predetermine threshold levels, the control system 14 may implement one or more control actions. It should be appreciated that the coherence threshold level may be set to any value (e.g., 0.2, 0.4, 0.6, and so forth). Likewise, the phase threshold level may be set to any value (e.g., 15 degrees, 30 degrees, 45 degrees, and so on) based on, for example, the operating modes and characteristics of the combustion dynamics behavior of the can combustor 52.

In one embodiment, upon detection of an impending LBO (e.g., based upon the coherence and phase difference derivations), the LBO analysis system 66 of the control system 14 may execute a control action to alter one or more machine operating parameters including, but not limited to, compressor 20 inlet airflow, compressor 20 exit airflow, compressor 20 inlet temperature, compressor 20 exit temperature, compressor 20 exit pressure, combustion system 22 (e.g., can combustors 52) fuel flow, combustion system 22 (e.g., can combustors 52) fuel splits, and so forth, to stabilize the flame and prevent an actual LBO from occurring in one can combustor 52 (e.g., can combustor 52A) and potentially propagating to other can combustors 52 (e.g., can combustor 52B).

Figure 4:
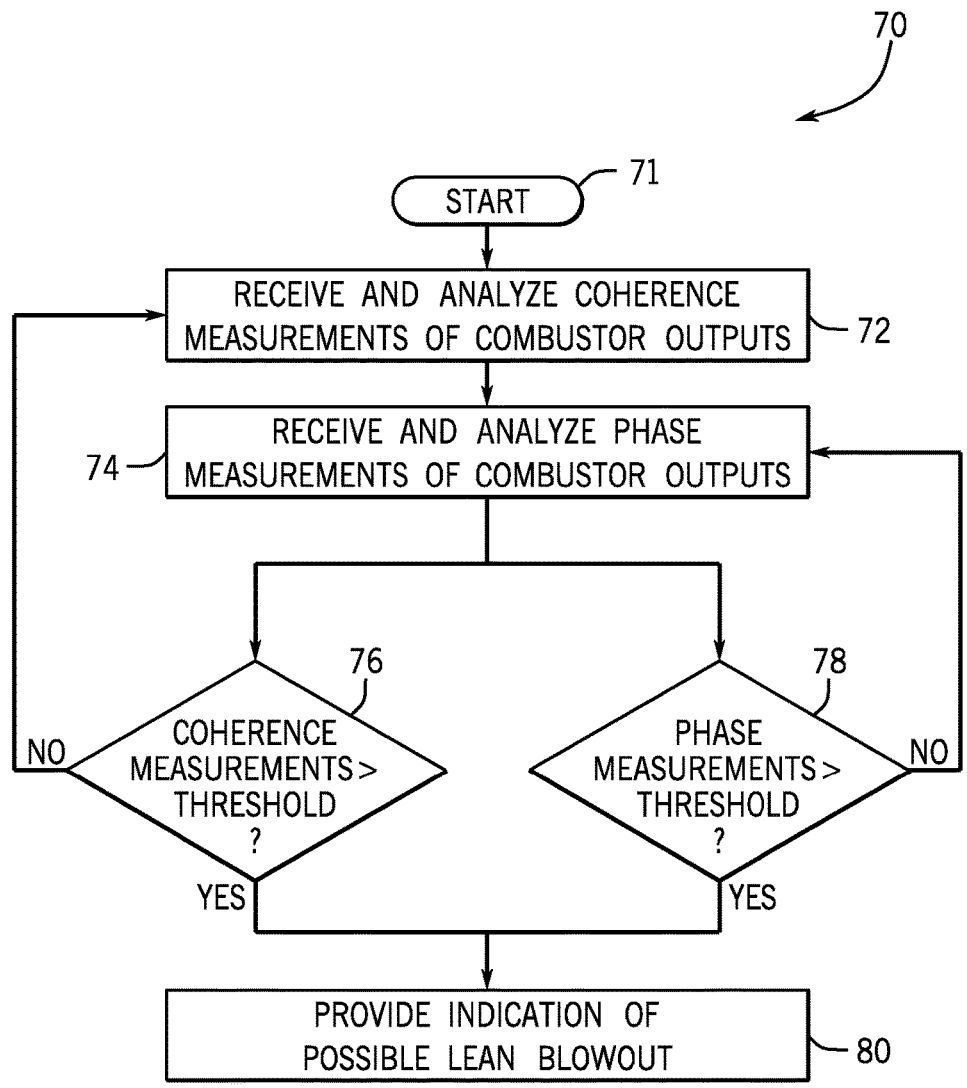
FIG. 4 is a flowchart illustrating an embodiment of a process suitable for detecting impending and actual LBO of the can-annular combustor of FIG. 2, in accordance with present embodiments.

Turning now to FIG. 4, a flow diagram is presented, illustrating an embodiment of a process 70 useful in deriving coherence and phase measurements associated with an impending or an actual LBO by using, for example, the LBO detection system 58 included in the control system 14 depicted in FIG. 3. The process 70 may include code or instructions stored in a non-transitory machine-readable medium (e.g., the memory 39) and executed, for example, by one or more processors (e.g., one or more processor(s) 38). The process 70 may begin (block 71) with the LBO detection system 58 of the control system 14 receiving and analyzing (block 72) coherence measurements of the outputs of the respective can combustors 52. For example, as noted above, the coherence derivation system 62 of the control system 14 may measure the coherence of the dynamic pressure signals of the can combustors 52. The LBO detection system 58 may then receive and analyze (block 74) phase difference measurements of the outputs of the respective can combustors 52. For example, the phase derivation system 62 of the control system 14 may measure the phase difference of the pressure signals of the can combustors 52 as the respective pressure and/or flame of the can combustors 52 begin to pulsate together. Although discussed as a sequential process, it should be appreciated that the LBO detection system 58 may derive the coherence and phase difference measurements sequentially with respect to one another or simultaneously.

The process 70 may continue with the LBO analysis system 66 of the control system 14 comparing the coherence measurements to a predetermined coherence threshold value. If the LBO analysis system 66 determines (decision 76) that the coherence measurements of the pressure signals of the can combustors 52 is above the predetermined coherence threshold, the LBO analysis system 66 may provide (block 80) an indication of an impending LBO. In certain embodiments, the LBO analysis system 66 may provide the indication of the impending LBO as a notification that may be displayed to, for example, an operator or engineer. In other embodiments, as discussed above, the LBO analysis system 66 of the control system 14 may provide a probability of the impending LBO or the actual LBO, and a control action (e.g., adjusting compressor 20 inlet airflow, compressor 20 exit airflow, compressor 20 inlet temperature, compressor 20 exit temperature, compressor 20 exit pressure, combustion system 22 fuel flow, or combustion system 22 fuel splits) may be executed. Similarly, the LBO analysis system 66 of the control system 14 may, concurrently with or sequentially to the analysis of the coherence measurements, compare the phase measurements to a predetermined phase difference threshold value. If the LBO analysis system 66 determines (decision 78) that the phase difference measurements of the pressure signals of the can combustors 52 is above (or below depending on configuration) the predetermined phase difference threshold, the LBO analysis system 66 may provide (block 80) an indication of a impending or an actual LBO in one or more can combustors 52, and subsequently, the control system 14 may determine a suitable control action. Particularly, the LBO analysis system 66 may determine an impending or an actual LBO based solely upon the coherence measurements derived by the coherence derivation system 62, or based solely upon the phase measurements derived by the phase derivation system 64. In other embodiments, the LBO analysis system 66 may determine an impending or an actual LBO based upon both the coherence measurements derived by the coherence derivation system 62 and the phase measurements derived by the phase derivation system 64.

Figure 5:
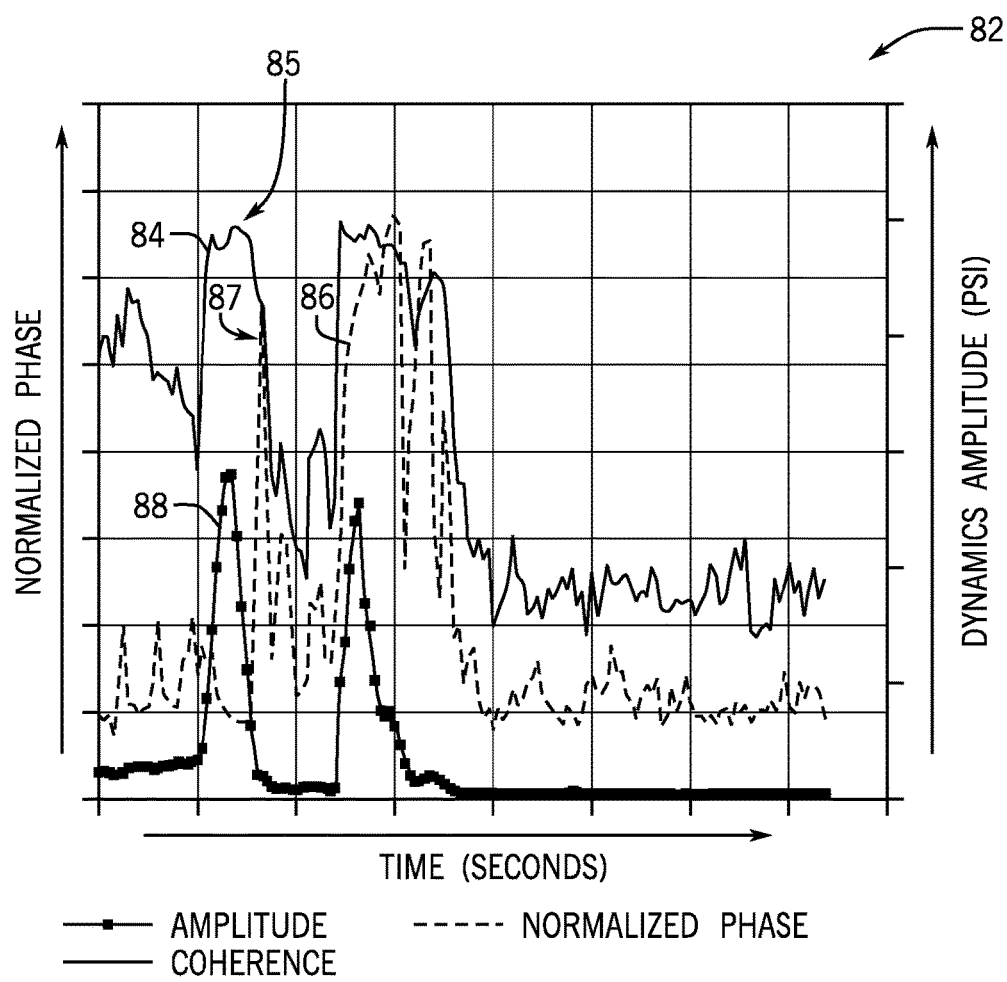
FIG. 5 is a plot diagram of an embodiment of a coherence detection signal and a phase difference detection signal, in accordance with present embodiments.

FIG. 5 illustrates a coherence detection signal 84 and a phase difference detection signal 86 as detected and analyzed, for example, by the LBO analysis system 66 of the control system 14 in accordance with the present embodiments. Specifically, as previously discussed, when the pressure pulsations and/or flame pulsations become unstable due to the occurrence of one or more of the can combustors 52 running lean, similar pressure pulsations and/or flame pulsations may be induced in each of the adjacent can combustors 52. This may be indicated and detected by an increase in the coherence detection signal 84, as well as a similar decrease in the phase detection signal 86. Based on the change in phase and coherence, the LBO analysis system 66 of the control system 14 may determine an impending LBO, and provide an indication and/or control action to prevent an actual LBO. Similarly, changes in the phase detection signal and/or the coherence detection signal may also indicate an actual LBO event in one or more can combustors 52. For example, an actual LBO in one or more can combustors 52 may be indicated and detected by a coherence spike 85 (e.g., a sudden increase in signal coherence) in the coherence detection signal 84, as well as a similar increase 87 in the phase difference detection signal 86 immediately following the increase in the coherence detection signal 84. A similar indication may be provided by a pressure amplitude signal 88, as illustrated in FIG. 5. Based on the signal increase 85 and 87, the LBO analysis system 66 of the control system 14 may determine an actual LBO in one or more can combustors 52, and provide an indication and/or control action in response.

Technical effects of the disclosed embodiments include systems and methods useful in detecting and deriving combustion system signal coherence and signal phase measurements as an indication of an impending or an actual LBO of one or more combustors of the combustion system, and to provide a notification and/or execute a control action before an actual LBO, or in response to an actual LBO event in one or more can combustors 52. Specifically, as the individual combustors begin to pulsate together, for example, at the same frequency, the measured signal coherence will increase. Indeed, as the pulsations propagate from one combustor to the next, and thus an increasing number of combustors begin to pulsate together (e.g., phase-lock), the measured phase difference between output signals of the combustors will decrease. Thus, an impending LBO or an actual LBO may be determined based solely upon the measured signal coherence, solely upon the measured phase difference, or determined based upon a combination of the measured signal coherence and the measured phase difference.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine comprising a plurality of combustors;
a plurality of sensors disposed throughout the gas turbine; and
a control system communicatively coupled to the plurality of sensors, the control system comprising:
   a controller, a non-transitory memory, and a processor configured to execute instructions stored in the memory;
wherein the control system is configured to:
   receive signals from the plurality of sensors;
   order the plurality of combustors into a plurality of pairs of combustors;
   calculate a respective coherence measurement of each pair of the plurality of pairs of combustors;
   compute a first mean of the respective coherence measurements of each pair of the plurality of combustors;
   calculate a respective phase difference measurement of each pair of the plurality of combustors;
   compute a second mean of an absolute value of the respective phase difference measurements of each pair of the plurality of pairs of combustors; and
   compare the first mean of the respective coherence measurements and the second mean of the absolute value of the phase difference measurements to respective coherence and phase difference threshold levels;
   derive an indication of an impending lean blowout (LBO) or an actual LBO of at least one of the plurality of combustors based at least in part on the comparison of the first mean to the coherence threshold level, the comparison of the second mean to the phase difference threshold level, or a combination thereof; and
   provide, via a display, the indication of the impending LBO or the actual LBO.

2. The system of claim 1, wherein each of the plurality of combustors generates a combustion pressure pulsation, a combustion flame pulsation, or a combination thereof; and wherein the sensors detect the combustion pressure pulsations, the combustor flame pulsations, or the combination thereof and provide signals of the detected pulsations as inputs to the control system.

3. The system of claim 2, wherein the sensors detect operational parameters and provide signals based on the operational parameters as the inputs to the control system, the operational parameters including carbon dioxide levels in an exhaust gas produced by the gas turbine, carbon content in fuel supplied to each of the plurality of combustors, temperature of the fuel, pressure, flow rate, clearance, and vibrations.

4. The system of claim 1, wherein the control system is configured to derive each of the respective phase difference measurements by measuring the phase difference between frequencies of pressure pulsations, flame pulsations, or both pressure pulsations and flame pulsations of each pair of the plurality of combustors.

5. The system of claim 1, wherein the control system is configured to:
   derive the indication of the impending LBO of the at least one of the plurality of combustors before an occurrence of the actual LBO; and
   provide, via the display, the notification of the indication of the impending LBO before the occurrence of the actual LBO.

6. The system of claim 1, wherein the control system is configured to derive coherence measurements of each pair of the plurality of combustors by measuring an overlap in frequencies of pressure pulsations, flame pulsations, or both pressure pulsations and flame pulsations between a second combustor of each pair a first combustor of each pair of the plurality of combustors.

7. The system of claim 1, wherein the control system is configured to execute a control action to avoid the impending LBO or to correct the actual LBO, following the derivation of the indication of the impending LBO or the actual LBO of the at least one of the plurality of combustors.

8. The system of claim 7, wherein the control system executes the control action to alter at least one operating parameter of the gas turbine system, the at least one operating parameter comprising compressor inlet airflow, compressor inlet temperature, compressor exit airflow, compressor exit temperature, compressor exit pressure, fuel flow to each of the plurality of combustors, and fuel splits to each of the plurality of combustors.

* * * * *